(12) United States Patent
Keilegom et al.

(10) Patent No.: US 6,312,169 B1
(45) Date of Patent: Nov. 6, 2001

(54) RELOCKABLE FILM CARTRIDGE FOR A PHOTOGRAPHIC SYSTEM

(75) Inventors: Roland Van Keilegom, Mortsel; Dirk Peeters, Kontich; Jozef Mostmans, Beerse, all of (BE)

(73) Assignee: Agfa-Gevaert, Mortsel (BE)

( * ) Notice: Subject to any disclaimer, the term of this patent is extended or adjusted under 35 U.S.C. 154(b) by 0 days.

(21) Appl. No.: 09/386,845

(22) Filed: Aug. 31, 1999

Related U.S. Application Data
(60) Provisional application No. 60/112,065, filed on Dec. 14, 1998.

(30) Foreign Application Priority Data

Sep. 14, 1998 (EP) .................................. 98203076

(51) Int. Cl.[7] .......................... G03B 17/26; G03B 42/04; B65D 85/42
(52) U.S. Cl. ........................... 396/517; 206/455; 378/182
(58) Field of Search ..................... 396/511, 517, 396/518, 519, 522; 206/455; 378/182, 183, 184, 185, 186, 187, 188

(56) References Cited

U.S. PATENT DOCUMENTS

| | | | |
|---|---|---|---|
| 1,098,844 | * | 6/1914 | Schmuck .............................. 396/517 |
| 3,971,470 | * | 7/1976 | White ................................... 206/455 |
| 4,727,391 | * | 2/1988 | Tajima et al. ........................ 396/517 |
| 5,473,400 | * | 12/1995 | Lemberger et al. ................. 396/513 |
| 5,712,486 | * | 1/1998 | Soltani et al. ....................... 378/184 |

FOREIGN PATENT DOCUMENTS

| | | |
|---|---|---|
| 34 26 260 | 1/1986 | (DE) . |
| 0 301 238 | 2/1989 | (EP) . |
| WO 92/15043 | 9/1992 | (WO) . |

* cited by examiner

Primary Examiner—Alan A. Mathews
(74) Attorney, Agent, or Firm—Breiner & Breiner, L.L.C.

(57) ABSTRACT

According to the invention there is provided a relockable cartridge for photosensitive media, comprising (a) photo-inert and optically opaque media-receiving tray having a media access opening; (b) flexible, photo-inert and optically opaque cover for the media access opening; the cartridge including an openable and relockable magnetic seal between at least portions of the cover and tray, characterized in that one part of the magnetic seal is located on upperlips or projective guides of said tray and the other part of the magnetic seal consists of or is fixed to said cover.

7 Claims, 2 Drawing Sheets

RELOCKABLE FILM CARTRIDGE FOR A PHOTOGRAPHIC SYSTEM

This application claims benefit of Provisional Application 60/112,065 filed Dec. 14, 1998.

FIELD OF THE INVENTION

The present invention relates to a solution for a method for packaging photographic films. More specifically the invention is related to a relockable casette or cartridge for medical imaging film.

BACKGROUND OF THE INVENTION

X-ray and other types of medical imaging photographic film are typically packaged in optically opaque (i.e. light-tight) and photo-inert containers such as cassettes, magazines, cartridges and bags. The film must be removed from these packages and loaded into the x-ray machine, camera or other imaging device under darkroom conditions, an inconvenient procedure.

U.S. Pat. No. 1,098,844 discloses a film package which can be loaded directly into a camera, thereby alleviating the need for a darkroom. However this package is relatively inefficient in design and requires manual manipulation to bring the film into exposure position. Said package is therefore incompatible with the automatic film handling mechanism of modern imaging systems.

U.S. Pat. No. 4,727,391 discloses a package for sheet film and a loading device for the package. The package includes a tray and a flexible cover peelably attached to the tray by an adhesive. After the package is loaded into a loading device of an image recorder, the cover is peeled off, enabling a delivery equipment to access the film. The adhesive layer has an edge portion inclined to the longitudinal direction of the tray so the cover can be peeled off easily.

Packages of the type shown in said patent contain many sheets of one specific type of film. However, depending on the nature of the image being exposed, it is often necessary to load different sizes and/or types of film into the photographic system. Any unexposed film remaining within a cartridge is therefore wasted if the cartridge must be removed from the photographic system so a new cartridge bearing a different type or size of film can be inserted.

"PCT/EP88/00166 discloses an automatic film loading device for sheet film cassettes. After a cassette is inserted into an unloading and reloading station in the device, the cassette is opened and the exposed sheet of film is seized, removed and transported to a developing apparatus. The cassette is then reloaded with a sheet of film from one of a plurality of supply magazines, each containing different sizes of film. The freshly loaded cartridge is then dispensed from the device for subsequent use. Although this automatic film loading device reduces the waste associated with the removal of unused film from an photographic system, it is a complicated and relatively expensive accessory for the photographic system."

PCT/US92/00890 discloses a resealable cartridge for photosensitive media, comprising: (a) photo-inert and optically opaque media-receiving tray having a media access opening; (b) flexible, photo-inert and optically opaque cover for the media access opening; and (c)photo-inert and optically opaque seal between the tray and the cover, the seal including an openable and resealable adhesive seal between at least portions of the cover and tray.

It is evident that there is a continuing need for improved film handling systems for photographic photographic systems. In particular, there is a need for a device which conveniently enables different sizes and/or types of film to be inserted into and removed from a medical photographic system without resulting waste. The device must be relatively inexpensive to be commercially viable.

OBJECTS OF THE INVENTION

It is an object of the present invention to provide a material for a relockable cartridge for photosensitive material, which permits the use of different sizes and/or kinds of photographic film in an photographic system without waste.

Further objects of the present invention will be clear from the description hereafter.

SUMMARY OF THE INVENTION

According to the invention there is provided a relockable cartridge for photosensitive media, comprising (a) photo-inert and optically opaque media-receiving tray having a media access opening; (b) flexible, photo-inert and optically opaque cover for the media access opening; the cartridge including an openable and relockable magnetic seal between at least portions of the cover and tray, characterized in that one part of the magnetic seal is located on upperlips or projective guides of said tray and the other part of the magnetic seal consists of or is fixed to said cover.

DETAILED DESCRIPTION OF THE INVENTION

Figure 1:
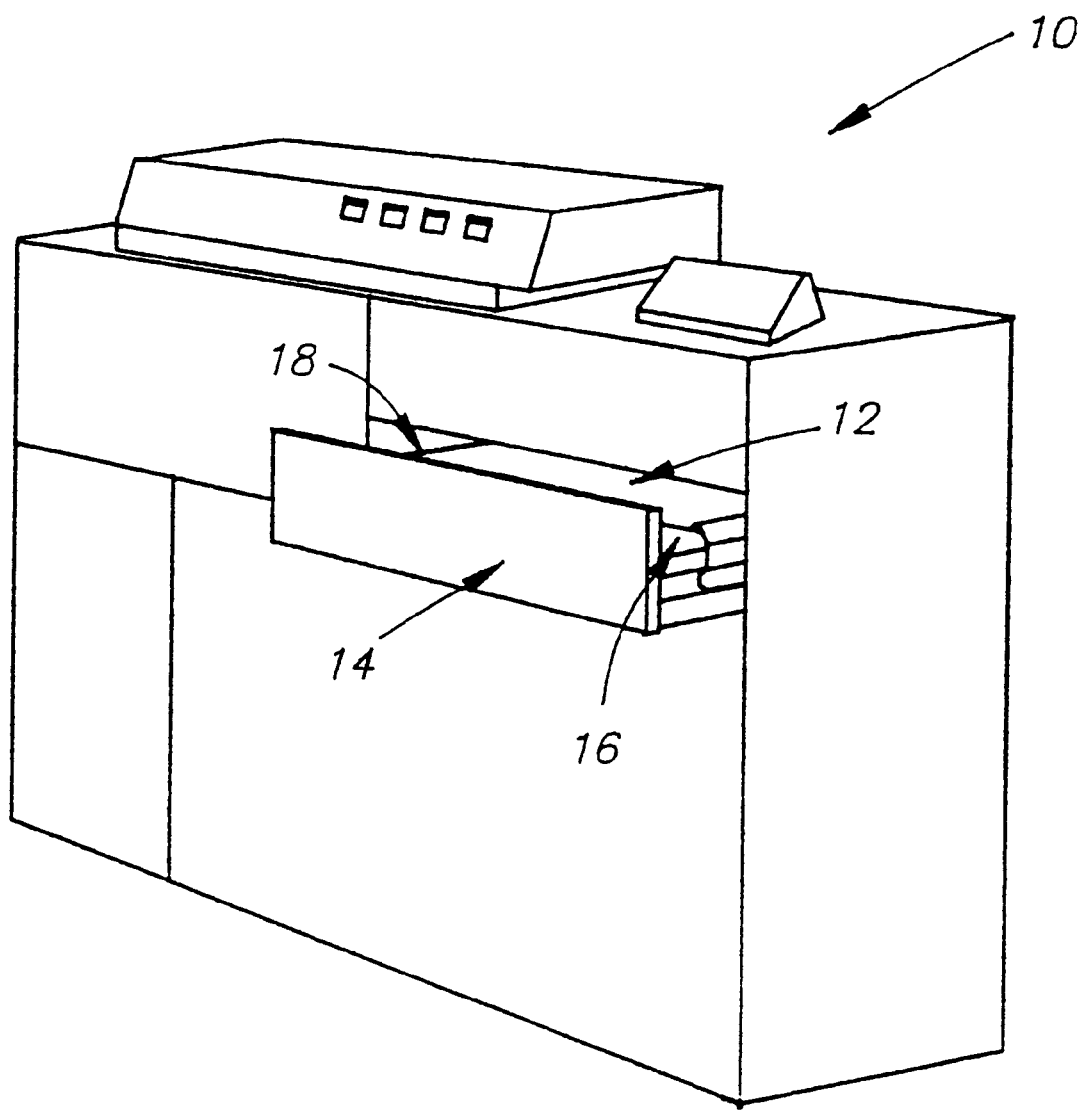
FIG. 1 shows a photographic system configured for use with a relockable film cartridge of the present invention.

FIG. 1 is an illustration of a photographic system 10 which is configured to operate with a relockable photographic film cartridge in accordance with the present invention. In the embodiment shown, photographic system 10 includes a drawer 14 which is opened to provide access to a cartridge-receiving base 16 into which film cartridge 12 is loaded. A cartridge opening/closing mechanism 18 is also mounted to drawer 14. After a film cartridge 12 has been loaded into base 16, drawer 14 is closed to lock the cartridge within a light-tight compartment. Opening/closing mechanism 18 then opens cartridge 12 to permit access to sheets of film (not visible in FIG. 1) in the cartridge. Sheets of film are removed from the opened cartridge 12 and imaged by other subsystems (not shown) of photographic system 10. The imaged film is temporary stored in a magazine (not shown) before being removed from photographic system 10 for subsequent processing. Alternatively, the imaged film can be automatically fed to a docked or attached film developer (not shown) for processing.

Opening/closing mechanism 18 is also actuated to close cartridge 12 before the cartridge can be removed from photographic system 10. Since cartridge 12 is relockable, it can be removed from photographic system 10 before all the film within the cartridge has been exposed. Cartridges 12 with different sizes or types of film media can therefore be conveniently loaded into and removed from photographic system 10 as needed, without wasting any unused film remaining in the cartridge.

Figure 2:
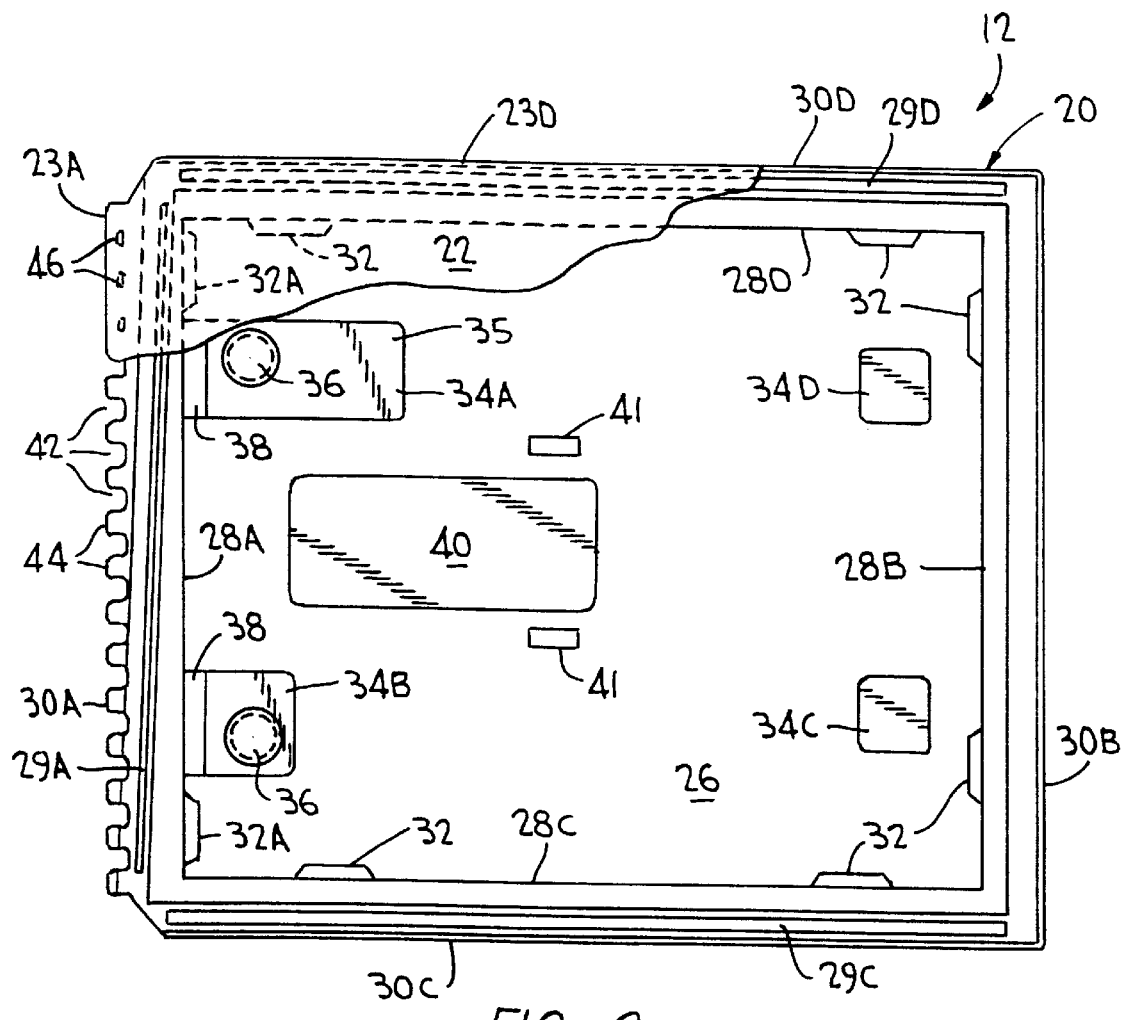
FIG. 2 is a top view of a relockable film cartridge in accordance with the present invention, with a portion of the cover broken away.
Figure 3:
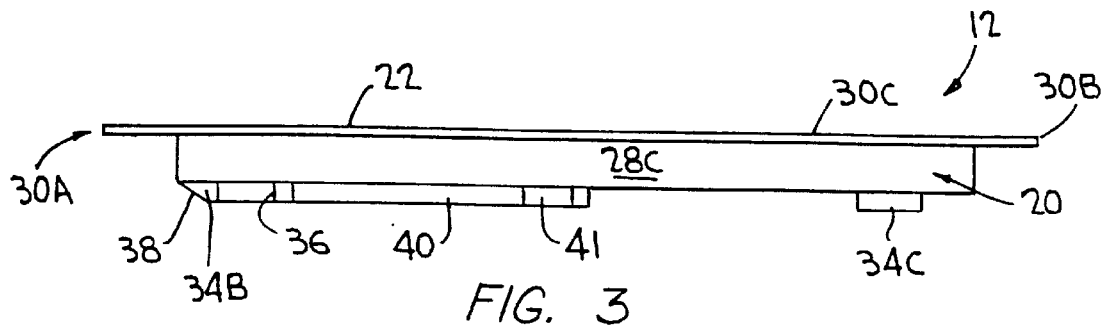
FIG. 3 is a side view of the cartridge shown in FIG. 2.

Relockable cartridge 12 can be described in greater detail with reference to FIGS. 2 and 3. As shown, cartridge 12 includes an optically opaque polymer film-receiving tray 20 and a flexible, optically opaque cover 22. Cover 22 is relockable attached to tray 20 by magnetic sealing strips or segments 29A, C–D. Tray 20 is preferably molded in one piece from a relatively inexpensive and photo-inert polyolefin material so that it is economically feasible to dispose of the cartridge following a single use. In one embodiment tray 20 is molded from 555-ABS material which is commercially available from the Dow Chemical Company. Polystyrene materials having appropriate characteristics can also be used.

"Tray 20 is a relatively shallow member and includes a generally planar bottom wall 26, front wall 28A, rear wall 28B and side walls 28C and D. Lips 30A–30D extend outwardly from the upper edges of respective walls 28A–28D, and circumscribe a film access opening of tray 20. Inwardly projecting guides 32 are formed on walls 28A–28D to properly position sheets of film (not shown) within tray 20. Feet 34A–34D are formed into and extend downwardly from bottom wall 26 to support cartridge 12 within base 16 of photographic system 10. Bottom wall 26 also includes positioning recesses 36 which can be tapered. Positioning recesses 36 are configured to receive positioning lugs extending from base 16. The position lugs secure and properly orient cartridge 12 within photographic system 10. In the embodiment shown, position recesses 36 are molded into feet 34A and 34B adjacent to front wall 28A. A media presence monitoring well 35 is also formed in bottom wall 26. Media presence monitoring sensors of photographic system 10 (not shown) extend into well 35 below the surface of bottom wall 26 when all film has been removed from tray 20."

Feet 34A and 34B (i.e. those adjacent to front wall 28A) also includes ramp surfaces 38 which slope downwardly from the lower edge of the front wall to the bottom of the feet. Ramp surface 38 guide feet 34A and 34B over the position lugs in photographic system base 16 as cartridge 12 is being loaded into the base. The embodiment of tray 20 illustrated in FIGS. 2 and 3 also includes a recess 40 in bottom wall 26 which forms a platform on the bottom exterior of tray 20. The platform formed by recess 40 is configured to receive an information bearing medium such as a bar code which includes recorded information pertaining to the characteristics of film within cartridge 12. A pair of feet 41 are formed as recesses in bottom wall 26 adjacent recess 40 to insure proper positioning of the information bearing medium with respect to a reading device (not shown) of photographic system 10. Reinforcing ribs (not shown in FIGS. 2 and 3) can also be molded into bottom wall 26 and/or side walls 28A–28D to increase the rigidity of tray 20.

The forwardmost or leading edge of front lip 30A also includes a series of evenly spaced cut-out sections 42. Cut-out sections 42 form a series of spaced projections 44 on the leading edge of lip 30A. Cut-out sections 42 and projections 44 cooperate with yet to be described aspects of cover 22 and opening/closing mechanism 18 to facilitate the opening and subsequent closing of cartridge 12.

Cover 22 is a flexible, photo-inert, optically opaque sheet sized to extent over the excess opening of tray 20. Cover 22 has edges 23A–23D (only edges 23A and 23D are shown in FIG. 2) which extend between and mate with tray lips 30A–30D, respectively. In one embodiment, cover 22 is a foil formed by a foil laminate formed by polyethylene bonded layers of one 25 $\mu$m thick polyethylene, 8.75 $\mu$m thick aluminium foil and 50 $\mu$m thick polypropylene. This foil laminate cover 22 is of a sufficiently stretchy nature to prevent the cover from popping off tray 20 when cartridge 12 is flexed, yet rigid enough to prevent detrimental amounts of stretch related buckling when the cover is rolled up. The foil laminate cover 22 also provides for the integrity of a vacuum within cartridge 12.

"In another embodiment, cover 22 is a magnetic foil."

A paper or polyester reinforcing strip (not separately shown) can be added to the leading or front edge 23A of cover 22 to increase cover rigidity above projections 44 and facilitate the operation of opening/closing mechanism 18. In one embodiment, the reinforcing strip is a 6 mm wide, 150 $\mu$m thick, strip of mylar. The front edge 23A of cover 22 extends over the tray cut-out sections 42, and includes elongated apertures 46 which are positioned over the cut-out sections when the cover is sealed onto tray 20. Apertures 46 facilitate the engagement of opening/closing mechanism 18 with cover 22.

"In one embodiment magnetic segments or strips can be applied on at least a part of the forward lip 30A and optionally on projecting guide 32A. Preferably said magnetic strips or segments are applied on at least a part of the forward and side lips 30 and/or on the forward lip 30A and on the top of the side forwardly projecting guides 32. More preferably said magnetic strips or segments are applied to the whole forward lip 30A and on optionally projecting guide 32A. Most preferably said magnetic strips or segments are applied to the whole forward lip 30A and optionally to projecting guide 32A and to a part of the side lips 30 and/or projecting guides 32 adjacent to the forward lip 30A or projecting guide 32A. Said magnetic strips or segments are preferably between 0.5 and 30 mm thick, more preferably between 1 and 5 mm thick. The cover then contains iron powder or comprises on the leading edges a metallic strip. Said metallic strips are preferably between 10 $\mu$m and 500 $\mu$m thick, more preferably between 25 and 100 $\mu$m thick."

In another embodiment metallic strips or segments can be applied on at least a part of the forward lip 30A and optionally on projecting guide 32A. Preferably said metallic strips are applied on at least a part of the forward and side lips 30 and/or on the forward lip 30A and on the top of the side forwardly projecting guides 32. More preferably said metallic strips are applied to the whole forward lip 30A and optionally projecting guide 32A. Most preferably said metallic strips are applied to the whole forward lip 30A and optionally to projecting guide 32A and to a part of the side lips 30 and/or projecting guides 32 adjacent to the forward lip 30A or projecting guide 32A.

"Said metallic strip is preferably between 0.5 and 10 mm thick, more preferably between 1 and 5 mm thick. The cover is then made of a magnetic foil. Said foil has a thickness preferably between 0.2 and 2 mm, more preferably between 0.5 and 1 mm."

What is claimed is:

1. A relockable cartridge for photosensitive media, comprising (a) a photo-inert and optically opaque media-receiving tray having a media access opening; (b) a flexible, photo-inert and optically opaque cover for the media access opening; the cartridge including an openable and relockable magnetic seal between at least portions of the cover and tray, said magnetic seal having a first part and a second part for co-operating with said first part, wherein said first part of the magnetic seal is located on lips or projecting guides of said tray and said second part of the magnetic seal consists of or is fixed to said cover.

2. A cartridge according to claim 1 wherein said lips comprise a forward lip and wherein said first part of said magnetic seal comprises magnetic segments or strips that are applied on at least a part of said forward lip.

3. A cartridge according to claim 2 wherein said lips further comprise side lips and wherein said first part of said magnetic seal comprises magnetic segments or strips that are applied on at least a part of said side lips.

4. A cartridge according to claim 2 wherein said magnetic strips or segments have a thickness between 0.5 and 30 mm.

5. A cartridge according to claim 1 wherein said lips comprise a forward lip and wherein said first part of said magnetic seal comprises metallic strips or segments that are applied on at least a part of said forward lip and wherein the cover is made of a magnetic foil.

6. A cartridge according to claim 1 wherein said lips comprise a forward lip and wherein said first part of said magnetic seal comprises metallic strips or segments that are applied on at least a part of said forward lip and wherein the cover is provided with magnetic strips.

7. A cartridge according to claim 6 wherein said metallic strips or segments have a thickness between 0.5 and 10 mm.

* * * * *